BURR BENTON.
Improvement in Bee Hives.
No. 120,698.    Patented Nov. 7, 1871.
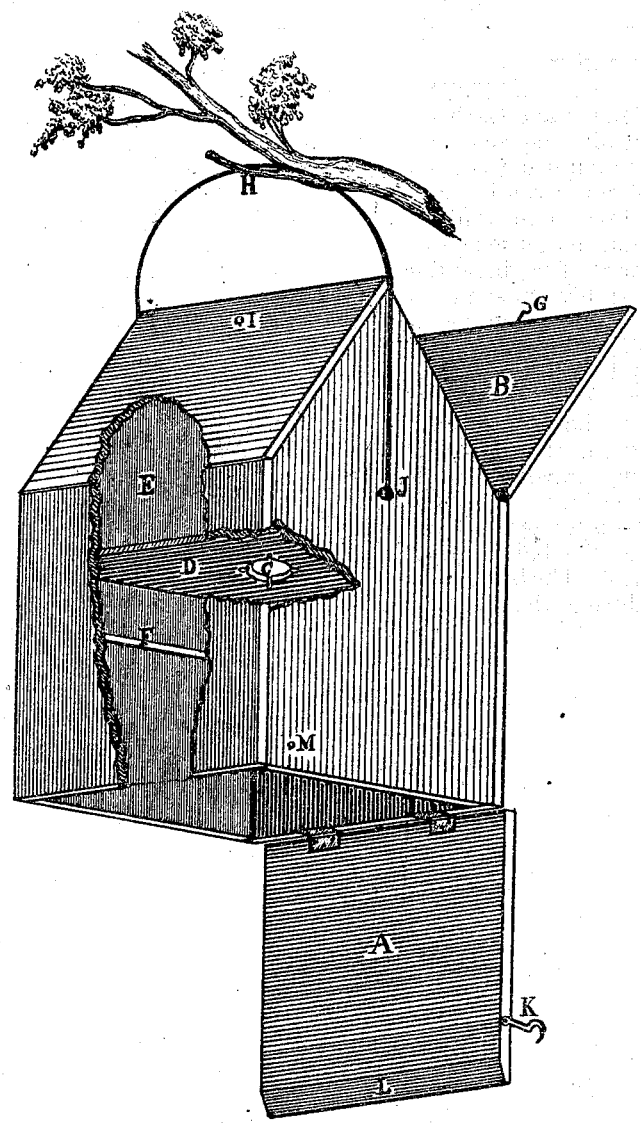
Witnesses:
D. B. Cook.
Perley Hale Jr.
Inventor
Burr Benton

UNITED STATES PATENT OFFICE.

BURR BENTON, OF WEESAW, MICHIGAN.

IMPROVEMENT IN BEE-HIVES.

Specification forming part of Letters Patent No. 120,698, dated November 7, 1871.

*To all whom it may concern:*

Be it known that I, BURR BENTON, of Weesaw, in the county of Berrien and State of Michigan, have invented certain Improvements in Bee-Hives, of which the following is a specification:

The first part of my invention relates to the suspending of the hive, to prevent its being molested by insects and to secure against smothering. The second part of my invention relates to the constructing of a hive in such a manner that the bottom can be dropped, preventing the accumulation of moths and millers, affording perfect ventilation, and facilitating the working of the bees. The hinged lid facilitates the taking out and replacing of the caps in the upper chamber of the hive without disturbing the bees.

The accompanying drawing represents a hive embodying my invention.

The hive can be suspended on the branch of a tree or on a pole by the bail H, secured to the sides of the hive at J. The bottom A of the hive can be dropped during the working season or closed in cold weather, and immediately after hiving. The bottom A of the hive can be fastened up by the hook K and staple M. When the bottom A is closed the beveled edge L offers passage for the bees to and from the hive. The hive is divided into two chambers by the partition D, in the center of which an opening, C, affords passage for the bees from the lower to the upper chamber E. In the lower chamber strips F are fastened to support the combs. The lid B is hung by hinges to the hive, and can be fastened up by the hook G and staple I.

I claim as my invention—

The bee-hive having an angular roof, hinged bottom A, bail H pivoted to the end walls, and lid B, formed by hinging one of the sides of the roof to the body of the hive, as specified.

BURR BENTON.

Witnesses:
PERLEY HALE, Jr.,
D. B. COOK.

(9)